July 20, 1954   J. J. OLSON   2,683,946
WEATHER FORECASTING DEVICE
Filed May 31, 1952

Inventor
JOHN J. OLSON
Attorney

Patented July 20, 1954

2,683,946

UNITED STATES PATENT OFFICE 2,683,946

WEATHER FORECASTING DEVICE

John J. Olson, Minneapolis, Minn., assignor to Brown & Bigelow, St. Paul, Minn., a corporation of Minnesota Application May 31, 1952, Serial No. 290,873

11 Claims. (Cl. 40—64)

My invention relates to an improvement in a device for forecasting weather conditions, particularly of a type which is composed of a pocket size elongated base member having mounted thereon a slideable indicator operable in conjunction with certain information and selectable information cards held on the base member.

It is an object of my invention to provide a device for forecasting weather changes of a simple and compact structure, thereby allowing the same to be easily carried in the user's pocket. It is a further object to provide an elongated base member which mounts a sliding indicator used to correlate information contained on the front of the device with information carried on the rear of the device. It is a further object to provide a weather forecasting device which holds a series of information cards which are interchangeable and also mounts a frontal card indicating certain cloud formations which are used in connection with the information cards found on the rear of the device by means of the slideable indicator.

It is an additional object of my invention to provide a weather forecasting device whereby a strip having cloud references indicated thereon is held in a simple manner by means of an elongated base, which cloud reference strip is referred to, and a slideable indicator is positioned over the clouds similar to those in the sky. With the slideable indicator in such a position, reference is then made to the rear of the device where a pointer member extending from the slideable indicator is opposite the wind directions, and upon ascertaining the actual wind direction, the weather forecast can be determined as it slides on the information strip adjacent the indication for the direction of the wind.

The invention will appear more clearly from the following detailed description when taken in connection with the accompanying drawings, showing by way of example a preferred embodiment of the inventive idea.

In the drawings forming part of the specification:

Figure 1:
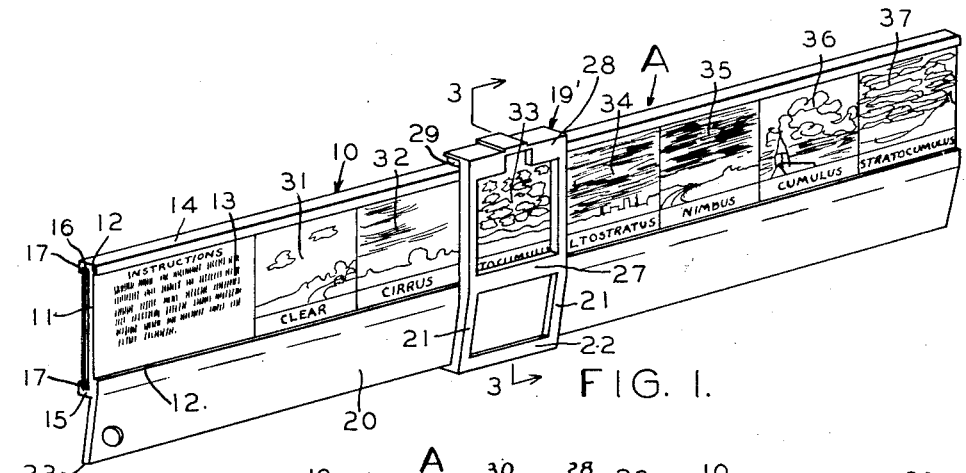
Figure 1 is a perspective view of my weather forecasting device.

My weather forecasting device A is composed of the elongated base member 10 which is formed of the front portion 11 which has formed throughout the length thereof the recess 12 adapted to receive the cloud indication strip 13 which is permanently secured in the recess 12. The elongated base member 10 also includes the top portion 14 and the bottom portion 15 which form the recess 16.

The recess 16 is formed with the longitudinal flanges 17 which maintain the series of information cards 18 within the recess 16, the outer-most card 19 being used in conjunction with the cloud indication strip 13 through the use of the slideable indicator 19'.

The elongated base member 10 has formed on the lower edge thereof the inwardly inclined elongated apron piece 20 adapted to receive the lower inclined leg members 21 of the slideable indicator piece 19'. Formed at the lower ends of the leg members 21 is the cross bar 22 which engages the lower edge 23 of the apron 20. The cross bar 22 has formed on the rear edge thereof the upstanding tongue member 23', when the indicator 19' is in place, engages the inner surface 24 of the apron 20 to maintain the lower portion of the slideable indicator 19' in position on the body 10. The slideable indicator 19' is formed with the upright members 25 which form the sides of the opening 26. The opening 26 is further formed by the intermediate bar member 27 and the top bar member 28 which joins the upper ends of the upright members 25. The top bar 28 has secured to the under surface thereof the spring member 29 which is urged against the top edge 14 of the body 10 when the slideable indicator 19' is in place on the device, particularly as shown in Figure 1.

The depending pointer 30 maintains the top portion of the slideable indicator 19' in position on the body 10, and the slideable indicator 19' is slipped onto the end of the device for positioning the opening 26 with regard to the cloud indication strip 13.

The cloud indication strip has formed on the one end thereof the following instructions:

1. Insert card on reverse side for your region and season.
2. Observe entire sky.
3. Move indicator over picture best matching your observation.
4. Determine direction from which wind is blowing. If calm or very light, use west.
5. Read forecast under pointer on back opposite wind direction.

The cloud indication strip 13 has printed on the face thereof a series of cloud formations, such as 31 which indicates what is known as a clear sky, 32 which illustrates a cirrus sky, 33 which indicates an altocumulus sky, 34 which indicates an altostratus, 35 illustrating a nimbus cloud formation, 36 which indicates a cumulus formation, and 37 which indicates a stratocumulus cloud formation. The opening 26 of the indicator 19' is approximately the size of the cloud indications 31 through 37 and is adapted to be positioned to frame any of the same.

Figure 4:
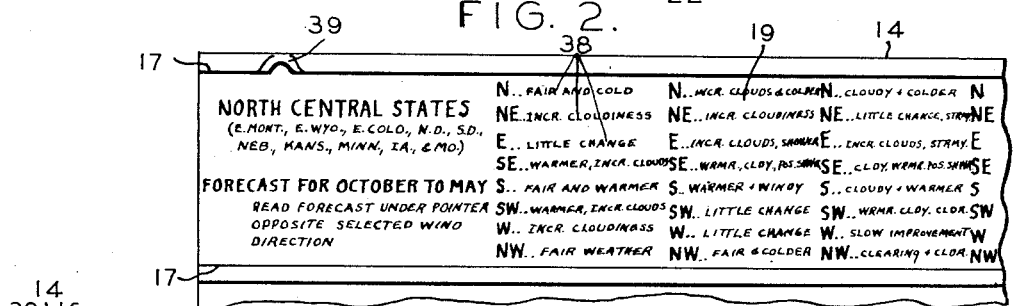
Figure 4 is an enlarged view of a portion of the base member with one of the information cards positioned thereon.
Figures 3, 5:
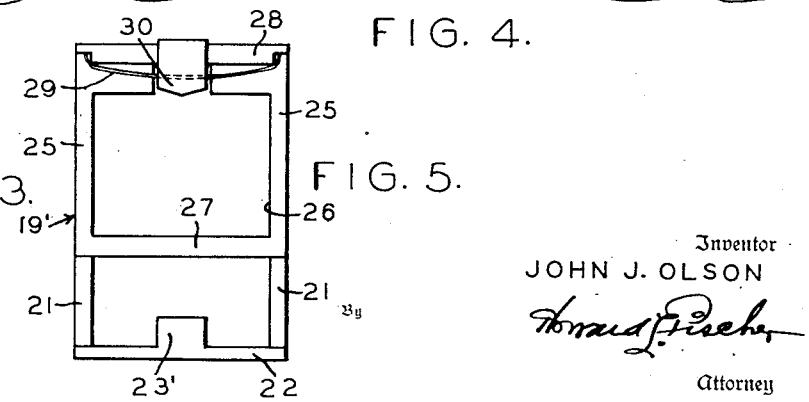
Figure 3 is a section on the line 3—3 of Figure 1.
Figure 5 is a rear view of the indicator device.

The information card 19 is an example of the series of information cards 18 and has printed on one end thereof the heading, "North Central States," and the information that it is used for the months of October to May, particularly illustrated in Figure 4. A further card is provided for May to October. Additional cards for other geographical areas, such as Great Lakes States, Northwestern States, etc., may be provided, each geographical area having an October to May and May to October information card. The cards 18 and 19 are stored in the recess 16, and as a result, my weather forecasting device A may be used in any section of the United States, and by similar appropriate cards it can be used for any designated section of the globe. The cloud indication strip 13 is the same regardless of what section of the country the device is used in.

Figure 2:
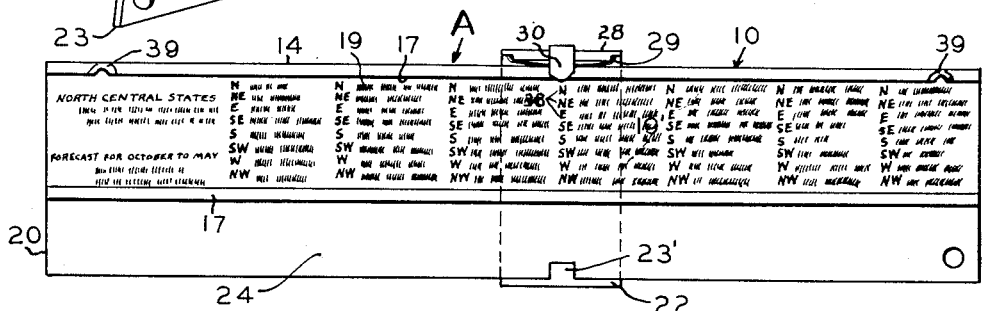
Figure 2 is a rear view of the device.

In using my device, the operator positions the slider indicator 19' on the elongated base member 10 and observes the sky to find the prominent cloud formation, such as altocumulus indicated in Figure 1, if such cloud formation is the prominent one existing. The indicator 19' is then allowed to remain in the position shown in Figure 1, and the device is reversed and the card 19, for example, is consulted if the operator is using the device in one of the North Central States indicated on the left of the card 19 as particularly shown in Figure 4. With the indicator in position shown in Figure 1, the pointer would then be above the wind indications shown in Figure 2. The operator then determines the direction from which the wind is blowing by various methods, such as smoke, trees, falling leaves, weather vanes, etc. The operator then selects the wind direction below the pointer 30 and determines the forecast opposite said wind direction indication. The forecasts opposite the wind direction indications, such as 38, are the result of scientific findings.

Thus with my new construction, a cloud indication card is protectively mounted on the front of the elongated base 10, and with the recess 16 formed on the rear side thereof, it is possible to store the necessary information cards 18 and 19. Further, with my construction I provide a simple sliding indicator 19' which allows simple and efficient use of the cards, such as 19, together with the cloud formation strip 13 and the information on the respective cards to forecast the weather.

In order that the sliding indicator 19' is maintained on the base 10, I provide the lugs 39 against which the pointer 30 abuts, thereby preventing the indicator 19' from slipping off either end of the base member 10.

The invention is not to be understood as restricted to the details set forth since these may be modified within the scope of the appended claims without departing from the spirit and scope of the invention.

Having thus described the invention, what I claim as new and desire to secure by Letters Patent is:

1. In a device for forecasting the weather, an elongated base member having a recess formed in the back surface and substantially throughout the length thereof, said recess having flanges formed on the sides thereof throughout its length, an indicator member slideably mounted on said base member and having an opening formed in the front thereof, a pointer formed on the back of said indicator flange, means in engagement with said flanges of said recess for maintaining said indicator on said base member, sections of different cloud formation indicia formed on the front surface of said base member in extended side by side relationship, a series of elongated cards having columns of wind directions and weather predictions opposite thereto for various sections of the country positioned in said recess and under said flanges so that with respect to the outermost of said cards, said columns are aligned with said sections of cloud formations whereby, when said opening of said indicator is positioned over the selected cloud formation section, said pointer is thereby positioned over one of said columns of wind direction for a reading of said forecast opposite the wind direction selected.

2. A device for forecasting the weather comprising an elongated base member having flanges formed on the rear thereof, a series of illustrations formed in extended side by side relationship on the face of said base member having different cloud formations depicted therein, a removeable card member mounted under said flanges for a particular section of the country including a series of columns of indicia indicating wind directions and weather forecasts opposite said wind directions, an indicator member slideably mounted on said base member having an opening formed therein on the front thereof adapted to be positioned over any of said cloud formation illustrations, a pointer formed on the rear of said slideable indicator whereby, when said opening of said indicator is placed over one of said cloud formation illustrations, said pointer is positioned above one of said wind direction columns for selecting said forecast information opposite the selected wind direction.

3. In a device for forecasting weather, a base member, an indicator member slideably mounted on said base member having a frame portion formed on the front thereof and a pointer formed on the rear thereof, one or more information cards mounted on the rear of said base member, information indicia formed on the face of said base member adapted to be used in connection with said information cards by means of the positioning of said frame portion on a portion of said information indicia, thereby automatically positioning said pointer adjacent a proper position on said information cards, and thereby forecast the weather.

4. A device for forecasting the weather including a base member, means for mounting one or more information cards on the rear of said base member, means for mounting an information card on the front of said base member, an indicator member slideably mounted on said base member, said indicator member having a pointer formed on the rear thereof and an opening formed on the front thereof whereby when said opening is placed opposite certain information on a card mounted on the front of said base, said pointer is thereby placed opposite certain information on a card mounted on the back thereof to forecast the weather.

5. A device for forecasting the weather comprising an elongated base member, an indicator member slideably mounted on said base member being formed with a frame portion on the front thereof and a pointer member formed on the upper rear edge thereof, one or more elongated information cards mounted on the rear of said base member, each having an elongated series of columns indicating wind directions and weather predictions opposite thereto, sections of cloud formations formed across the face of said base member adapted to be used in connection with said information cards by means of the positioning of said frame portion over the proper cloud formation and thereby automatically positioning said pointer over said wind direction columns for use of the weather forecast opposite thereto.

6. A weather forecasting instrument including a rule-like member having a series of pictures indicating cloud formations with indicia associated therewith, together with instructions for operating said forecaster associated with said pictures, a slideable frame member adapted to be moved to frame one of said pictures selected to illustrate the cloud formation, said slideable member having a pointer on the rear portion thereof, an indicator member removeably positioned on the back of said rule-like member to permit different indicator members to be placed in position on the back of said rule-like member, each removeable member having a series of vertical columns of indicia indicating the wind direction and after said wind indicia horizontally disposed, indica forecasting the weather, thereby permitting the operator to select with the slideable frame on the face of said indicator the cloud formation of the day, and then referring to the back of the indicator where said pointer will indicate the vertical column of wind indicia permitting the operator to forecast the weather by the clouds and the direction of the wind.

7. A weather forecaster instrument including an elongated body member having a series of picture indicia on the face thereof to indicate different cloud formations in the sky, a slideable framing means position on said body member adapted to selectively frame the cloud formation in the sky, an indicator on said framing means at the back thereof, a wind and weather indicating means mounted on the back of said instrument body adapted to cooperate with said pointer on said framing member to indicate a vertical column of indicia which indicates the wind direction, and weather indicating indicia after each indicia of said vertical column which indicates the wind direction, thereby permitting the operator to select the cloud formation in the sky by said framing means on the front of said instrument and then refer to the back of said instrument to the column indicating the direction of the prevailing wind to forecast the weather by the indicia adjacent the indicia which indicates the wind direction.

8. A weather forecasting sliderule instrument having indicia on one side thereof to indicate different cloud formations which normally occur in the sky, slideable means set to select the cloud formation appearing in the sky, said slideable means having an indicator projecting therefrom on the back of said instrument, and a series of indicia positioned in columns below said indicating means to permit the operator to determine the direction of the wind, after determining the cloud formation in the sky, and to read the weather forecasting indicia positioned adjacent the indicia indicating the wind direction and thereby permitting the operator to forecast the weather from day to day by determining the cloud formation in the sky and the direction of the wind.

9. A weather forecasting device including a base member having a series of cloud formations formed on the front thereof and indicia on the back thereof including vertical columns of wind directions, indicia opposite said wind directions including weather forecasts, a frame member slideably mounted on said base member having means for positioning the same over one of said cloud formations and simultaneously opposite one of said wind direction columns for reading off the forecast opposite said wind direction.

10. A weather forecasting instrument including a slideable selector, indicia indicating various cloud formations normally appearing in the sky, changeable indicia on the back of said instrument adapted to indicate the wind direction, and after each indication of the wind direction, indicia to forecast the weather whereby, when said selector indicates the cloud formation of the day, the operator turns the instrument over, and on the back thereof the selector indicates a column of wind direction indicia, and therefrom the operator determining the direction of the wind, reads the forecast of the weather after the selected wind direction.

11. A device for forecasting the weather including an elongated substantially rectangular base member, right angular portions formed on the upper and lower longitudinal edges of said base member thereby forming a recess, an elongated apron portion depending from said lower right angular flange portion, a selector member slidably mounted on said base member and apron including a front frame member, a right angular flange portion formed on the lower edge of said frame portion and adapted to engage the lower edge of said apron portion, a right angular flange portion formed on the upper edge of said frame and adapted to engage said upper right angular flange of said base member to slidably mount said frame on said base member, spring means secured between said right angular flange of said frame and of said base member to retard the movement of said frame, sections of different cloud formation indicia formed on the front surface of said base member, a removable card member mounted under said flanges including a series of columns of indicia indicating wind directions and weather forecasts opposite thereto, a pointer formed on the right angular portion of said frame members whereby when said frame is positioned opposite one of said cloud formations said pointer is placed above one of said wind direction columns for selection of said forecast information opposite the selected wind direction.

References Cited in the file of this patent

UNITED STATES PATENTS

| Number | Name | Date |
|---|---|---|
| 2,508,273 | Krick | May 16, 1950 |
| 2,572,531 | Steinkoenig | Oct. 23, 1951 |

FOREIGN PATENTS

| Number | Country | Date |
|---|---|---|
| 343,658 | France | Aug. 12, 1904 |
| 567,493 | France | Dec. 7, 1923 |